United States Patent
McBrien

(10) Patent No.: US 10,317,082 B2
(45) Date of Patent: Jun. 11, 2019

(54) DISTRIBUTED FUEL CONTROL SYSTEM

(71) Applicant: HAMILTON SUNDSTRAND CORPORATION, Charlotte, NC (US)

(72) Inventor: Gary M. McBrien, South Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 684 days.

(21) Appl. No.: 14/457,373

(22) Filed: Aug. 12, 2014

(65) Prior Publication Data

US 2016/0047550 A1    Feb. 18, 2016

(51) Int. Cl.
*F23R 3/28*    (2006.01)
*F02C 7/22*    (2006.01)
(Continued)

(52) U.S. Cl.
CPC ............. *F23R 3/28* (2013.01); *F02C 7/222* (2013.01); *F02C 7/228* (2013.01); *F02C 9/263* (2013.01);
(Continued)

(58) Field of Classification Search
CPC .... F23R 3/28; F02C 9/26; F02C 9/263; F02C 9/28; F02C 9/32; F02C 9/46; F02C 7/22;
(Continued)

(56) References Cited

U.S. PATENT DOCUMENTS

| 2,716,862 A | * | 9/1955 | Block | F02C 9/32 |
| | | | | 60/39.281 |
| 4,578,945 A | * | 4/1986 | Peck | F02C 9/26 |
| | | | | 60/39.281 |

(Continued)

FOREIGN PATENT DOCUMENTS

| EP | 2613038 | | 7/2013 | |
| GB | 2088962 | * | 6/1982 | ............... F02C 9/26 |
| JP | S61205340 | | 9/1986 | |

OTHER PUBLICATIONS

Extended European Search Report dated Jan. 14, 2016 in European Application No. 15180510.8.
(Continued)

*Primary Examiner* — William H Rodriguez
*Assistant Examiner* — William L Breazeal
(74) *Attorney, Agent, or Firm* — Snell & Wilmer, L.L.P. (UTC)

(57) ABSTRACT

Distributed fuel control system and methods are disclosed. A distributed fuel control system may comprise a controller, a fuel delivery system, and fuel delivery system sensors and combustion sensors. The controller may output a control signal in response to at least one of the fuel delivery system sensor or the combustion sensors. In response, the fuel flow to individual multiplex fuel delivery unit may be controlled according to various methods. One such method includes determining a desired fuel pressure differential, directing a torque motor to set a pressure regulator to a position corresponding to the desired fuel pressure differential, determining a sensed fuel pressure differential, and adjusting the torque motor in response to a difference between the sensed fuel pressure differential and the desired fuel pressure differential.

14 Claims, 8 Drawing Sheets

(51) Int. Cl.
*F02C 7/228* (2006.01)
*F02C 9/26* (2006.01)
*F02C 9/34* (2006.01)

(52) U.S. Cl.
CPC ............ *F02C 9/34* (2013.01); *F05D 2240/40* (2013.01); *F05D 2270/09* (2013.01); *F05D 2270/304* (2013.01); *F05D 2270/306* (2013.01); *F05D 2270/3015* (2013.01); *Y02T 50/672* (2013.01)

(58) Field of Classification Search
CPC .......... F02C 7/222; F02C 7/228; F02C 7/232; F05D 2270/3015; F05D 2270/306; F05D 2270/101
See application file for complete search history.

(56) References Cited

U.S. PATENT DOCUMENTS

| | | | | |
|---|---|---|---|---|
| 4,716,719 A | | 1/1988 | Takahashi et al. | |
| 5,107,674 A | * | 4/1992 | Wibbelsman | F02C 7/26 60/778 |
| 5,292,225 A | * | 3/1994 | Dyer | F01D 21/18 415/29 |
| 5,442,922 A | * | 8/1995 | Dyer | F02C 7/228 60/739 |
| 6,755,024 B1 | * | 6/2004 | Mao | F23D 11/107 239/416 |
| 2003/0093184 A1 | * | 5/2003 | Tanaka | F02C 9/28 700/289 |
| 2003/0140613 A1 | * | 7/2003 | Dyer | F02C 9/263 60/39.281 |
| 2005/0217269 A1 | | 10/2005 | Myers, Jr. | |
| 2010/0319356 A1 | * | 12/2010 | Takeda | F02C 6/00 60/773 |
| 2011/0185736 A1 | * | 8/2011 | McKinney | F23R 3/06 60/752 |
| 2012/0324903 A1 | * | 12/2012 | Dewis | F02C 7/143 60/772 |
| 2015/0027100 A1 | * | 1/2015 | Qin | F02C 7/228 60/39.091 |
| 2015/0192074 A1 | * | 7/2015 | Eifert | F02C 9/28 60/776 |

OTHER PUBLICATIONS

European Patent Office, European Office Action dated Dec. 7, 2018 in Application No. 15180510.8.

* cited by examiner

DISTRIBUTED FUEL CONTROL SYSTEM

FIELD

The present invention relates to a fuel control system for a turbine engine, and more particularly, a fuel control system with distributed control of the fuel supplied to individual multiplex fuel delivery units.

BACKGROUND

Turbine engines typically have multiple multiplex fuel delivery units inside the engine. Fuel is injected into the engine via these multiplex fuel delivery units. Often, it may be desirable to control fuel flow to the engine, such as to turn the fuel flow on and off and to regulate the overall mass flow rate of the fuel. However, the multiplex fuel delivery units are often prone to limited controllability, and due to variations in the multiplex fuel delivery units, the fuel flow is prone to unwanted variations, or to uneven distribution to the multiplex fuel delivery units.

SUMMARY

A method of distributed fuel control is disclosed. The method of distributed fuel control includes determining, by a controller for distributed fuel control having a processor and a tangible, nontransitory memory, a desired fuel pressure differential. The method also includes directing, by the controller, a torque motor to set a pressure regulator to a position corresponding to the desired fuel pressure differential and determining, by the controller, a sensed fuel pressure differential. The method further includes adjusting, by the controller, the torque motor in response to a difference between the sensed fuel pressure differential and the desired fuel pressure differential A distributed fuel control system is disclosed. The distributed fuel control system includes a controller having a processor and a tangible, nontransitory memory and a fuel delivery system disposed in fluidic communication with a fuel supply containing fuel and with an engine. The system also includes fuel delivery system sensors and combustion sensors. In various embodiments, the controller is in logical communication with the combustion sensors and the fuel delivery system sensors. In various embodiments, the controller outputs a control signal to the fuel delivery system in response to at least one of the combustion sensors and the fuel delivery system sensors.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. As used herein, to be connected in "fluid communication" or "fluidic communication" or to be in "fluidic interconnection" means that a passage exists between the connected elements via which a fluid, including a gas and/or a liquid and/or any other non-solid matter, may pass from one connected element to another connected element. As used herein, "logical communication" or "logical connection" may refer to any method by which information may be conveyed. Logical communication may facilitate the transmission of signals, whether analog or digital, between two or more components. Thus, "logical communication" may refer to any electrical, electromagnetic, radiofrequency and/or optical method whereby information may be conveyed.

Figure 1:
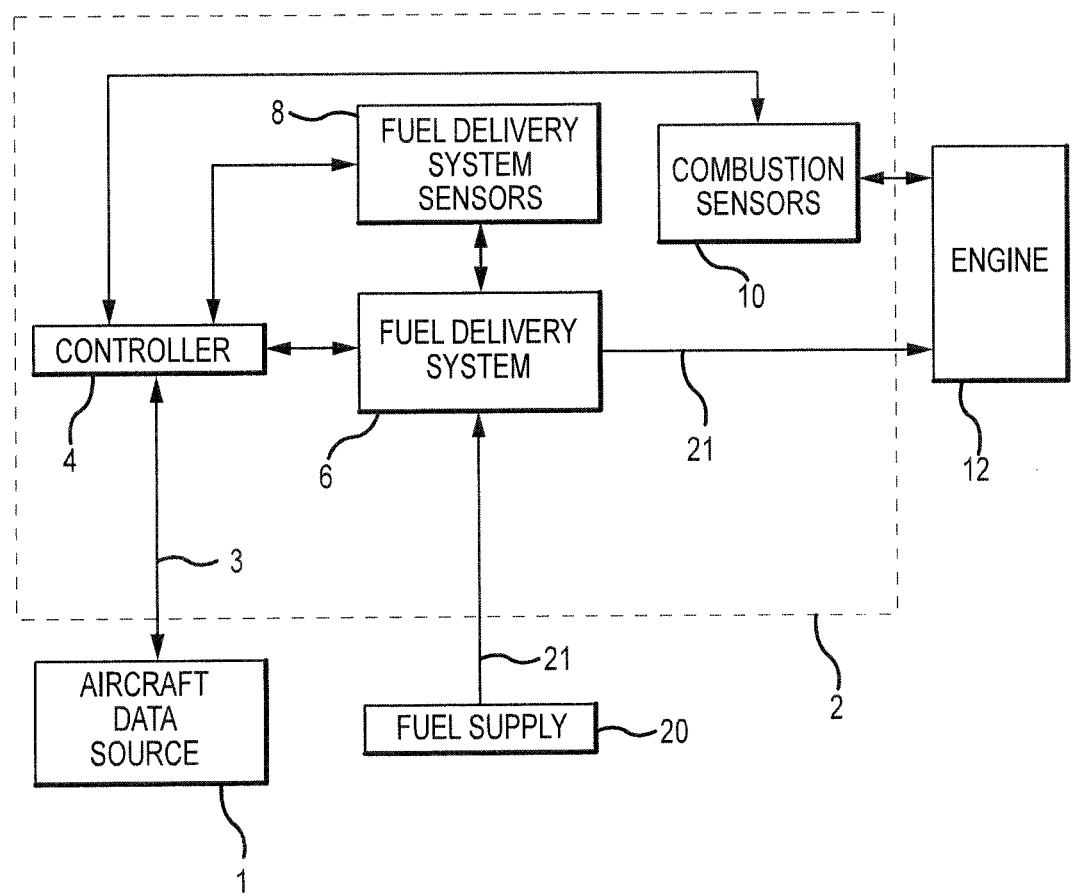
FIG. 1 illustrates a block diagram illustrating various functional relationships of a distributed fuel control system according to various embodiments.

With reference to FIG. 1, a distributed fuel control system 2 may comprise a controller 4, a fuel delivery system 6, fuel delivery system sensors 8, and combustion sensors 10. A distributed fuel control system 2 may receive fuel 21 from a fuel supply 20 and may supply this fuel 21 to an engine 12. A distributed fuel control system 2 may deliver this fuel 21 via a multiplex fuel delivery unit array (FIG. 2; 24) comprising multiplex fuel delivery units disposed in the engine 12. The distributed fuel control system 2 may permit individualized control and/or monitoring of fuel flow to the individual multiplex fuel delivery units of the multiplex fuel delivery unit array. For example, due to variations in multiplex fuel delivery unit characteristics, individual control of fuel flow to each multiplex fuel delivery unit may be desired to achieve a desired fuel pressure, volume, and/or velocity at each multiplex fuel delivery unit. Similarly, dynamic control of fuel pressure, volume, and/or velocity may be desired. For example, in different use scenarios, different fuel pressures may be desired, and/or different multiplex fuel delivery units may be desired to operate at different fuel pressures. Thus, the fuel 21 may be delivered according to different methods, and may be monitored by various sensors, such as combustion sensors 10.

A controller 4 may comprise a processor and a tangible, non-transitory memory. The controller 4 may accept various inputs and perform various logical processes in response to the inputs. The controller 4 may provide various outputs in response to the logical processes. The controller 4 may regulate the passage of fuel through the fuel delivery system 6 in response to the inputs. For example, the controller 4 may receive data from the fuel delivery system sensors 8 and the combustion sensors 10 and may control the fuel delivery system 6 in response to a determination of an action in response to the inputs. Moreover, the controller 4 may comprise other aircraft systems, or may itself be a logical subset of other aircraft systems. Thus, the controller 4 may be in logical communication with other aircraft systems.

For example, the controller 4 may be in logical communication with an aircraft data source 1. Aircraft data source 1 may comprise an aircraft data source or an engine data source, such as an aircraft data bus, a global positioning system (GPS), a full authority digital engine control (FADEC), an electronic engine controller (EEC), an engine control unit (ECU), a flight computer, an airspeed indicator, an altimeter, a weight-on-wheels (WOW) switch, a parking brake position switch, and/or any other aircraft system, instrument, or data source whereby the status of the aircraft may be determined. The status of the aircraft may include information such as whether an aircraft is parked, taxiing, taking off, climbing, cruising, descending, and/or landing. The status of the aircraft may include information such as an engine status, an engine throttle setting, an engine temperature, an engine maintenance status, whether an aircraft is on the ground, and whether the aircraft is in the air. Aircraft status data 3 may be provided by aircraft data source 1 to the controller 4. In this manner, the controller 4 may be made aware of the context in which the aircraft is operating.

Controller 4 may also be in logical communication with fuel delivery system sensors 8. The controller 4 may receive signals from the fuel delivery system sensors 8 that indicate various information about the flow of fuel through the fuel delivery system 6, engine performance, and/or fault conditions. The controller 4 may also be in logical communication with combustion sensors 10. The controller 4 may receive signals from the combustion sensors 10 that indicate various information about the flow of fuel into the engine 12, engine performance, and/or fault conditions. Controller 4 may also be in logical communication with fuel delivery system 6. Controller 4 may provide instructions to the fuel delivery system 6 in response to various methods performed responsive to data from fuel delivery system sensors 8 and/or data from combustion sensors 10 and/or aircraft data source 1 and/or multiplex fuel delivery unit array 24. In this manner, controller 4 may control the delivery of fuel 21 to the engine 12.

A fuel delivery system 6 may comprise valves, tubing, pumps, regulators, and any other component or combinations of components whereby fuel 21 may be delivered from a fuel supply 20 to an engine 12.

Fuel delivery system sensors 8 may comprise any electrical, fluidic, optical, and/or mechanical sensor or combinations of sensors whereby dynamic and/or static characteristics of the fuel 21 and of the fuel delivery system 6 may be monitored.

Similarly, combustion sensors 10 may comprise any electrical, fluidic, optical, and/or mechanical sensor or combinations of sensors whereby dynamic and/or static characteristics of the fuel delivered to the engine 12 and of the engine 12 may be monitored.

The engine 12 may comprise a gas turbine. However, an engine 12 may comprise various supporting systems, such as pumps, gearboxes, valves, and tubing. In various embodiments, the engine 12 comprises a turbofan engine. In further embodiments, the engine 12 comprises a turboprop engine, or a turbojet engine, or any other form of turbine engine. Moreover, in still further embodiments, the engine 12 does not comprise a turbine engine, but comprises an internal combustion engine, for example, an internal combustion engine having pistons, and/or an internal combustion engine comprising a rotary engine. Alternatively, the engine 12 may comprise an internal combustion reciprocating engine, such as one based on Otto cycle, or Diesel cycle, or Miller cycle, or Atkinson cycle, or an internal combustion rotary engine (e.g., Wankel), or another internal combustion engine, or an external combustion continuous engine such as a gas turbine engine (based on the open Brayton cycle), or any other engine. Furthermore, the engine 12 can be an internal combustion engine which is naturally aspirated or with forced induction (e.g., turbo-charged or super-charged). The engine 12 may have a turbocharger which may be a single or dual (twin) configuration using a centrifugal compressor directly coupled to either an axial inflow or centrifugal inflow turbine, and whose operation may be further enhanced by structures such as: variable vane geometries, articulated waste gates, blow-off/pressure relief valves, and by methods such as: intercooling, water spray injection, etc.

The fuel 21 may comprise a kerosene-type jet fuel such as Jet A, Jet A-1, JP-5, and/or JP-8. Alternatively, the fuel may be a wide-cut or naphtha-type jet fuel, such as Jet B and/or JP4. Furthermore, the fuel may be a synthetic fuel, such as Fischer-Tropsch Synthetic Paraffinic Kerosene (FT-SPK) fuel, or Bio-Derived Synthetic Paraffinic Kerosene (Bio-SPK), or may be any other suitable fuel, for example, gasoline or diesel.

The fuel supply 20 may comprise any suitable fuel storage mechanism. For example, in various embodiments, the fuel supply 20 comprises bladder tanks. In some embodiments, the fuel supply 20 comprises tanks disposed in at least one of an aircraft fuselage and an aircraft wing, although any type of tank disposed in any location may be envisioned.

Figure 2:
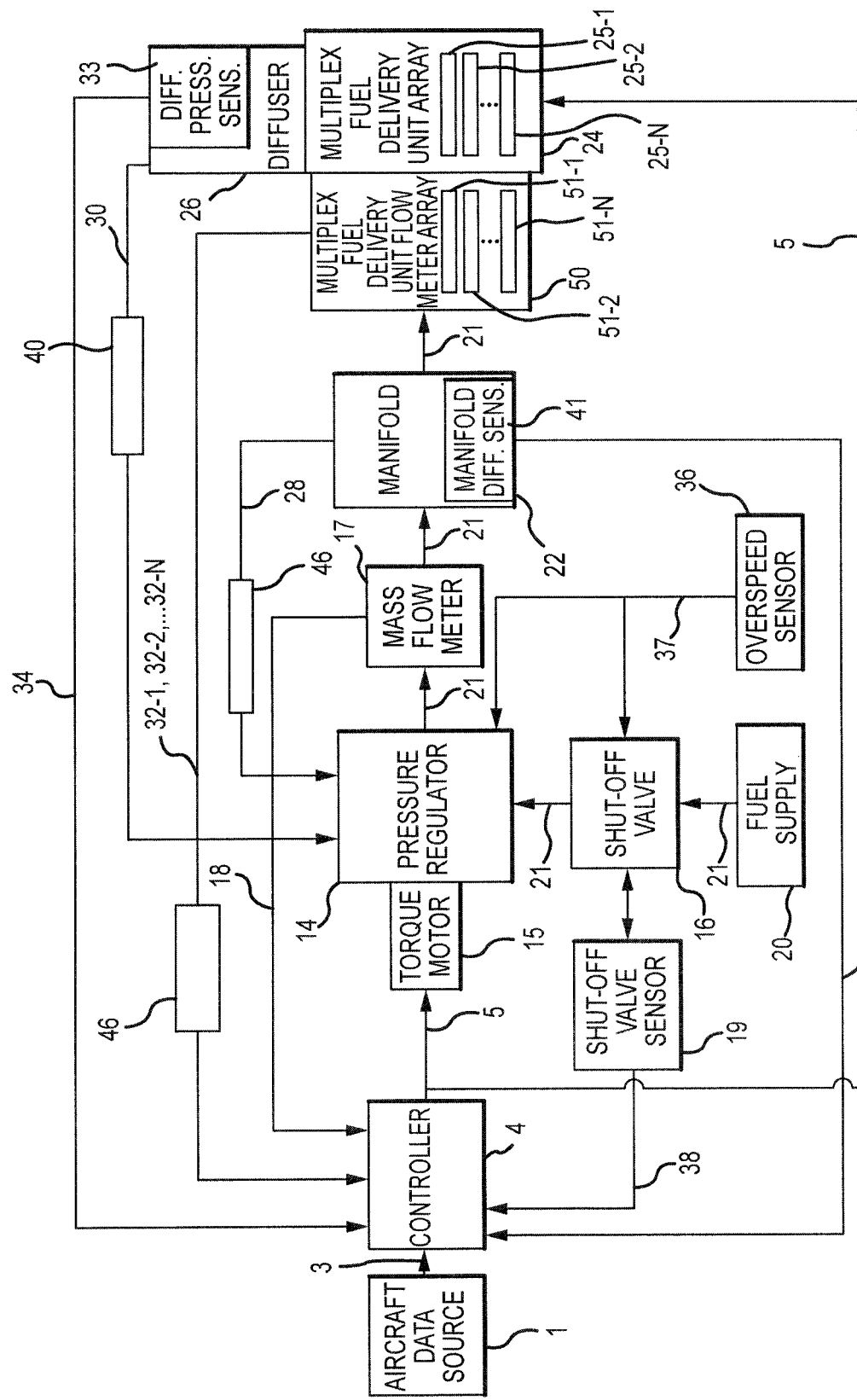
FIG. 2 illustrates various aspects of a distributed fuel control system according to various embodiments.

Having discussed various structures of a distributed fuel control system 2, with reference to FIG. 2, various aspects of a fuel delivery system 6 (FIG. 1) is presented in greater detail. In various embodiments, a fuel delivery system 6 comprises a pressure regulator 14, a shutoff valve 16, a manifold 22, a multiplex fuel delivery unit array 24 and a diffuser 26.

A pressure regulator 14 may comprise a delta-P regulator. For example, the pressure regulator 14 may compare the pressure differential between an input port and an output port and maintain a desired difference determined by a relative set point of the pressure regulator 14. However, in further embodiments a pressure regulator 14 may comprise a constant pressure regulator 14. For example, the pressure regulator 14 may compare the pressure differential between an output port and a scalar set point value and may maintain the output port at a constant absolute pressure and/or a constant pressure relative to the surrounding atmosphere. Thus, a pressure regulator 14 may comprise any regulator having desired characteristics.

A pressure regulator 14 may be in mechanical communication with a torque motor 15. The torque motor 15 may actuate in response to a control signal 5 from the controller 4. The pressure regulator 14 may be adjusted in response to the actuating; for example, the torque motor 15 may change the regulator relative set point. In this manner, the desired differential between the input port and the output port may be varied.

A pressure regulator 14 may comprise signal pressure inputs. For example, a pressure regulator 14 may be in fluidic communication with a diffuser pressure sense line 40 and a manifold pressure sense line 46, as discussed further herein. The pressure regulator 14 may alter the regulator output pressure in response to the relative and/or absolute pressures conveyed by these sense lines and in view of the regulator relative set point. During pressure changes in either of the two sensed locations, the pressure regulator can respond rapidly to maintain the differential pressure commanded by the controller acting through the torque motor 15.

In general, the pressure regulator 14 may use the regulator relative set point (set by the torque motor) to determine an adjustable bypass flow quantity or an adjustable series pressure drop. In this manner, the pressure regulator may maintain the desired pressure differential across the signal pressure inputs. Furthermore, combinations of adjustable valves and fixed orifices may be connected between the two pressures, and the adjustable valves may be opened and closed to various positions to set the desired flow at multiple locations, while the regulator continues to maintain the desired pressure differential across the signal pressure inputs, as discussed further herein.

A fuel delivery system 6 may also comprise a shutoff valve 16. The shutoff valve 16 may be disposed in fluidic communication with a fuel supply 20. Fuel 21 may travel from the fuel supply 20, through the shutoff valve 16, and to the pressure regulator 14. In various embodiments, the shutoff valve 16 provides a fuel shutoff for the fuel delivery system 6. In this manner, the fuel supply 20 may be selectively disconnected from aircraft systems, for example, at least portions of the fuel delivery system 6, such as during an emergency, a system failure, a fire, or any other event whereupon the fuel supply 20 is desired to be disconnected.

A fuel delivery system 6 may also comprise a manifold 22. The manifold 22 may receive fuel 21 from the pressure regulator 14 and distribute the fuel 21 to a multiplex fuel delivery unit array 24. The manifold 22 may comprise a body having a cavity wherein fuel may be supplied and subsequently distributed. For example, the manifold 22 may comprise a body having a cavity with one input port wherein fuel 21 is supplied. The manifold 22 may have multiple output ports. For example, the multiplex fuel delivery unit array 24 may comprise multiple multiplex fuel delivery units (25-1 through 25-*n*) and the manifold 22 may distribute fuel to all of the multiplex fuel delivery units. Multiplex fuel delivery unit flow meter array 50 may be disposed between the multiplex fuel delivery unit array 24 and the manifold 22 and may comprise sensors configured to monitor the fuel flow (e.g., pressure and/or velocity and/or volume) delivered to each multiplex fuel delivery unit. The manifold 22 is sized to provide substantially equal pressure and/or velocity and/or volume to all output ports. Thus, it may be said that the manifold 22 may comprise any apparatus whereby the fuel supply from the pressure regulator 14 may be distributed among multiple other system components.

The fuel delivery system 6 may comprise a diffuser 26. In various embodiments, a diffuser 26 comprises a perforated annulus disposed within an engine (FIG. 1; 12). An oxidizer such as air may pass through perforations in the diffuser 26, facilitating mixing of the oxidizer with the fuel. The diffuser 26 may be disposed annularly outward of a multiplex fuel delivery unit array 24.

The fuel delivery system 6 may also comprise a multiplex fuel delivery unit array 24. The multiplex fuel delivery unit array 24 may comprise a plurality of multiplex fuel delivery units whereby fuel is ejected into an engine 12. For example, the multiplex fuel delivery unit array 24 may comprise multiplex fuel delivery units 25-1, 25-2 through 25-*n* where n is a desired number of multiplex fuel delivery units. The multiplex fuel delivery units may be arranged annularly inward of the diffuser 26, although any arrangement whereby fuel is mixed with an oxidizer may be implemented. The multiplex fuel delivery unit array 24 may comprise a circular arrangement of six multiplex fuel delivery units and a single multiplex fuel delivery unit disposed at the center. For example, FIG. 3B illustrates one example arrangement.

Now, having discussed various aspects of a fuel delivery system 6, continued attention is directed to FIG. 2 and the fuel delivery system sensors 8 are discussed in detail. The distributed fuel control system 2 may comprise one or more sensors configured to detect the status of various elements and processes within the fuel delivery system 6. For example, the fuel delivery system sensors 8 may comprise a mass flow meter 17 reporting mass flow data 18, an overspeed sensor 36 reporting overspeed sensor information 37, a shutoff valve sensor 19 reporting shutoff valve position data 38, a manifold pressure sense line 46 providing manifold pressure sense line information 28 ("MPSL information") (e.g., a first manifold sense pressure), and a manifold pressure sense sensor 41 providing manifold pressure sense signal data 43 ("MPSS data"). Various of these sensors may be in electrical, mechanical, and/or fluidic communication with various other system components, for example, the controller 4 and/or the shutoff valve 16, and/or the pressure regulator 14.

A mass flow meter 17 may comprise a sensor configured to detect the mass flow rate of a fluid, for example, fuel 21 passing from the fuel supply 20 through the fuel delivery system 6. In various embodiments, a mass flow meter 17 is disposed in fluidic communication with both the pressure regulator 14 and the manifold 22 and measures the mass flow rate of the fuel 21 passing into the manifold 22 from the pressure regulator 14. In this manner, the total fuel used by engine 12 may be monitored (mass flow data 18). The mass flow meter 17 may encode the mass flow data 18 and provide an electronic signal to the controller 4 comprising the mass flow data 18.

The value of mass flow read by the mass flow meter 17 can be used in combination with the total of the mass flows read by each of the multiplex fuel delivery unit flow meters of the multiplex fuel delivery unit flow meter array 50 in order to calculate a correction constant to refine the accuracy of the individual multiplex fuel delivery unit flow meters and/or multiplex fuel delivery units. Under different operating conditions where various valves are open to varying degrees, the mass flow meter 17 can be read along with all the individual multiplex fuel delivery unit flow meters to produce in effect "n" equations in "n" unknowns (an "n" by "n" array), and solved using linear algebra techniques, thus allowing further refinements of fuel flow calibration of each individual multiplex fuel delivery unit flow meter in addition to the uniform correction value arrived at by comparing the sum of the individual multiplex fuel delivery unit flow meter flows to that of the mass flow meter 17.

Other sensors may provide mechanical or fluidic signals, rather than electronic signals. For example, an overspeed sensor 36 may provide an overspeed sensor information 37 as a mechanical and/or fluidic signal, to the pressure regulator 14. In this manner, the pressure regulator 14 may actuate very rapidly in response to an over speed situation, rather than experiencing the encoding delays inherent in electronic signals. For example, in the event that the aircraft or an component of engine 12 runs at an excessive speed, pressure, or temperature, it may be desirable to quickly terminate or reduce fuel flow in order to diminish the thrust being output from engine 12 and facilitate termination of the over speed event. Thus, the overspeed sensor 36 may provide a fluidic pressure comprising the overspeed sensor information 37 to the pressure regulator 14. The pressure regulator 14 may rapidly close (e.g., terminate fuel flow) in response to a deviation of this pressure from a nominal value. Similarly, the overspeed sensor 36 may be in fluidic communication with a shutoff valve 16. The overspeed sensor 36 may similarly provide a fluidic pressure comprising the overspeed sensor information 37 to the shutoff valve 16. The shutoff valve 16 may rapidly close (e.g., terminate fuel flow) in response to a deviation of this pressure from a nominal value. Thus, one may appreciate that various components may have redundant functionality. For example, in the event of compound system failures wherein control of one or more components may be compromised, shutoff valve 16 and/or a pressure regulator 14 may provide backup protection against over speed situations.

A shutoff valve sensor 19 may be disposed proximate to the shutoff valve 16. In various embodiments, the shutoff valve sensor 19 comprises a sensor that detects the state of the shutoff valve 16. For example, the shutoff valve sensor 19 may indicate whether the valve is open or closed. In various embodiments, the shutoff valve sensor 19 comprises a magnetic proximity sensor, although it may variously comprise an optical sensor, a capacitive sensor, an inductive sensor, a mechanical switch, or any sensor whereby the state of the shutoff valve 16 may be determined. The shutoff valve sensor 19 may be in logical communication with controller 4 and may indicate the state of the shutoff valve 16 via the shutoff valve position data 38.

A manifold pressure sense line 46 may be disposed between the manifold 22 and the pressure regulator 14. A manifold pressure sense line 46 may comprise a fluidic channel, for example, a tubing, whereby the pressure of the fuel 21 within the manifold 22 may be conveyed to the pressure regulator 14. Thus, it may be said that the manifold pressure sense line 46 conveys MPSL information 28 to the pressure regulator 14. The pressure regulator 14 may take various actions in response to this pressure.

A manifold pressure sense sensor 41 may comprise a sensor configured to detect the pressure of a fluid, for example, fuel 21, within the manifold 22. A manifold pressure sense sensor 41 may comprise a piezoelectric pressure transducer, or an electromagnetic pressure sensor wherein the displacement of a diaphragm is measured, or may comprise any type of sensor whereby the pressure of a fluid may be determined. The manifold pressure sense sensor 41 may determine the pressure of a fluid within the manifold 22 and may provide MPSS data 43 to controller 4 in response. The manifold pressure sense sensor 41 may comprise any sensing device by which the pressure of fluid in the manifold 22 may be measured.

With continuing attention to FIG. 2, the combustion sensors 10 are discussed in detail. In various embodiments, the distributed fuel control system 2 may comprise one or more sensors configured to detect the status of various apparatuses and processes within the engine 12 and/or the fuel delivery system 6. For example, the combustion sensors 10 may comprise a diffuser pressure sense line 40 reporting diffuser pressure sense line information 30 ("DPSL information") (e.g., a first diffuser sense pressure), a diffuser pressure sense sensor 33 reporting diffusion pressure sense signal data 34 ("DPSS data"), a multiplex fuel delivery unit flow meter array 50 comprising a plurality of multiplex fuel delivery unit flow meters 51-1, 51-2, through 51-$n$ where n is the number of multiplex fuel delivery units (25-1, 25-2, through 25-$n$). The multiplex fuel delivery unit flow meters 51-1, 51-2, through 51-$n$ may report individual multiplex fuel delivery unit flow data 32-1, 32-2 through 32-$n$ to controller 4.

The combustion sensors 10 may comprise a multiplex fuel delivery unit flow meter array 50. A multiplex fuel delivery unit flow meter array 50 may be disposed between the manifold 22 and the multiplex fuel delivery unit array 24. A multiplex fuel delivery unit flow meter array 50 may comprise a plurality of multiplex fuel delivery unit flow meters 51-1, 51-2, through 51-$n$ where n is the number of multiplex fuel delivery units (25-1, 25-2, through 25-$n$) reporting individual multiplex fuel delivery unit flow data 32-1, 32-2 through 32-$n$ to controller 4. A multiplex fuel delivery unit flow meter may comprise a sensor configured to detect the mass flow rate of a fluid, for example, fuel 21 passing from the manifold 22 through a corresponding multiplex fuel delivery unit. For example, a multiplex fuel delivery unit flow meter 51-1 may comprise a sensor configured to detect the mass flow rate of a fluid, for example, fuel 21 passing from the manifold 22 through multiplex fuel delivery unit 25-1. Similarly, a multiplex fuel delivery unit flow meter 51-2 may comprise a sensor configured to detect the mass flow rate of a fluid, for example, fuel 21 passing from the manifold 22 through multiplex fuel delivery unit 25-2, and any multiplex fuel delivery unit flow meter 51-$n$ may comprise a sensor configured to detect the mass flow rate of a fluid, for example, fuel 21, passing from the manifold 22 through any multiplex fuel delivery unit 25-$n$.

A diffuser pressure sense line 40 may be disposed between the diffuser 26 and the pressure regulator 14. A diffuser pressure sense line 40 may comprise a fluidic channel, for example, a tubing, whereby the pressure of a fluid (a first diffuser sense pressure), such as a fluidic mixture (e.g., fuel 21 and/or fuel/oxidizer mixture) within the diffuser 26 may be conveyed to the pressure regulator 14. Thus, it may be said that the diffuser pressure sense line 40 conveys DPSL information 30 to the pressure regulator 14. The pressure regulator 14 may take various actions in response to this pressure.

A diffuser pressure sense sensor 33 may comprise a sensor configured to detect the pressure of a fluid, such as a fluidic mixture (e.g., fuel 21 and/or fuel/oxidizer mixture) within the diffuser 26. A diffuser pressure sense sensor 33 may be in logical communication with controller 4. A diffuser pressure sense sensor 33 may comprise a piezoelectric pressure transducer, or an electromagnetic pressure sensor wherein the displacement of a diaphragm is measured, or may comprise any type of sensor whereby the pressure of a fluid may be determined. The diffuser pressure sense sensor 33 may determine the pressure of a fluid within the diffuser 26 and may provide DPSS data 34 to controller 4 in response. The diffuser pressure sense sensor 33 may comprise any sensing device by which the pressure of fluid in the diffuser 26 may be measured.

Figure 3A:
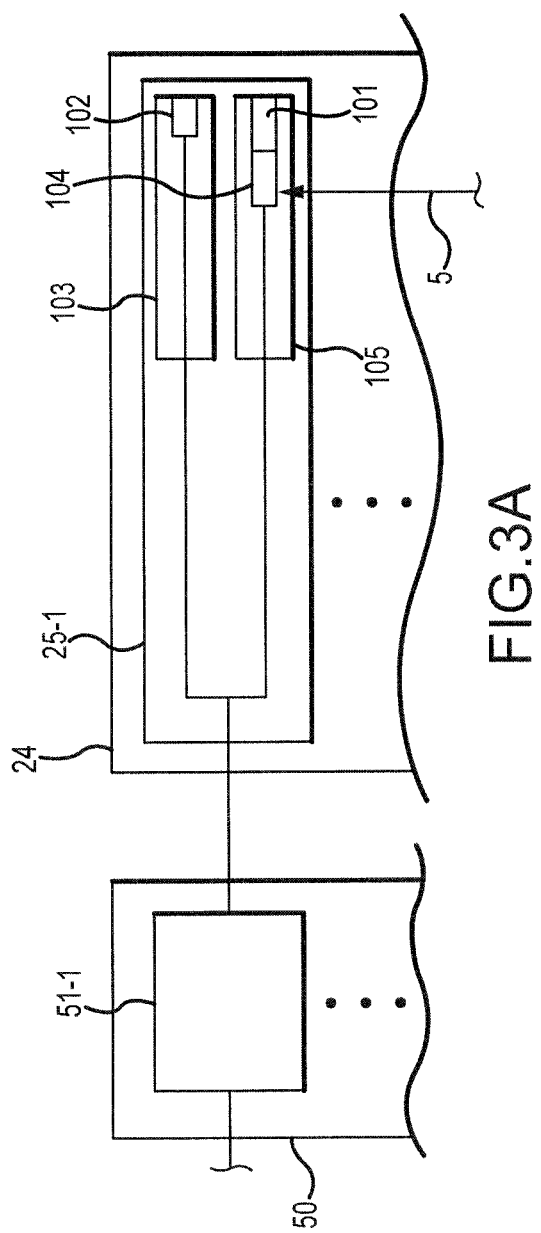
FIG. 3A illustrates various aspects of a distributed fuel control system, including a multiplex fuel delivery unit array according to various embodiments.
Figure 3B:
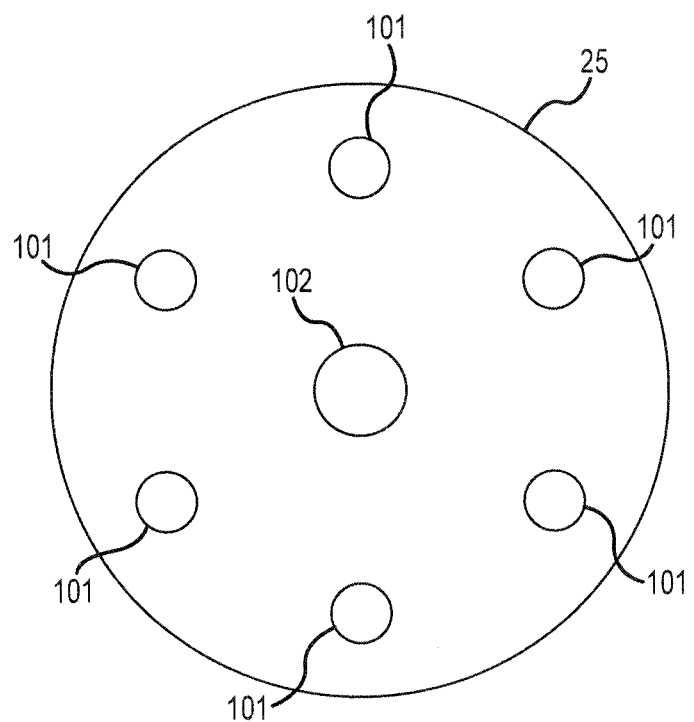
FIG. 3B illustrates an example orientation of various aspects of a multiplex fuel delivery unit-array according to various embodiments.

Now, with reference to FIGS. 3A and 3B, various aspects and embodiments of a multiplex fuel delivery unit 25-1 (and similarly, a multiplex fuel delivery unit 25-2, or any multiplex fuel delivery unit through 25-*n*), are disclosed. A multiplex fuel delivery unit may comprise any mechanism by which fuel 21 may be expelled into an engine 12 wherein it is combined with an oxidizer and combusted. In various embodiments, a multiplex fuel delivery unit may comprise a duplex orifice configuration or a simplex orifice configuration. For example, a multiplex fuel delivery unit comprising a duplex orifice configuration may comprise a fixed orifice 103 comprising a primary nozzle 102, and an electric valve orifice 105 comprising a main nozzle 101 and an electric valve 104. In contrast, a multiplex fuel delivery unit comprising a simplex orifice configuration may comprise an electric valve orifice 105 comprising a main nozzle 101 and an electric valve 104.

A fixed orifice 103 may comprise an aperture whereby fuel 21 is expelled from the multiplex fuel delivery unit. The fixed orifice 103 may have a fixed size and/or flow rate. In various embodiments, the fixed orifice 103 comprises a primary nozzle 102. A primary nozzle 102 may comprise a structure shaped to distribute and/or atomize the fuel 21 being expelled into the engine (FIG. 1, 12). With reference to FIGS. 2 and 3A-B, in various embodiments, a multiplex fuel delivery unit array 24 comprises a multiplex fuel delivery unit having a primary nozzle 102 disposed in the center of the multiplex fuel delivery unit array 24.

An electric valve orifice 105 may also comprise an aperture whereby fuel 21 is expelled from the multiplex fuel delivery unit. However, the electric valve orifice 105 may have a variable size and/or flow rate. In various embodiments, the electric valve orifice 105 comprises a main nozzle 101 and an electric valve 104. A main nozzle 101 may comprise a structure shaped to distribute and/or atomize the fuel 21 being expelled into the engine (FIG. 1, 12). With reference to FIGS. 2 and 3A-B, in various embodiments, a multiplex fuel delivery unit array 24 comprises multiplex fuel delivery units each having a main nozzle 101 disposed about the perimeter of the multiplex fuel delivery unit array 24. Thus, multiple main nozzles 101 are depicted in FIG. 3B, illustrative of multiple multiplex fuel delivery units each comprising an electric valve orifice 105. Moreover, an electric valve 104 may comprise any apparatus whereby the flow rate and/or size of the electric valve orifice 105 may be varied. Moreover, an electric valve 104 may be connected in logical communication with a controller 4. With reference to FIGS. 2 and 3A, an electric valve 104 may receive a control signal 5 from a controller 4, whereby the position of the valve may be set in response to a control signal 5.

Having discussed various components of a distributed fuel control system 2, a distributed fuel control system 2 may operate according to various methods. For example, with reference to FIGS. 4-7, several example methods of operation are disclosed, although one may appreciate that these methods may be combined in whole or in part, and other variations are contemplated in light of the structures and logical interconnection, fluidic interconnections, and mechanical interconnections contemplated herein.

Figure 4:
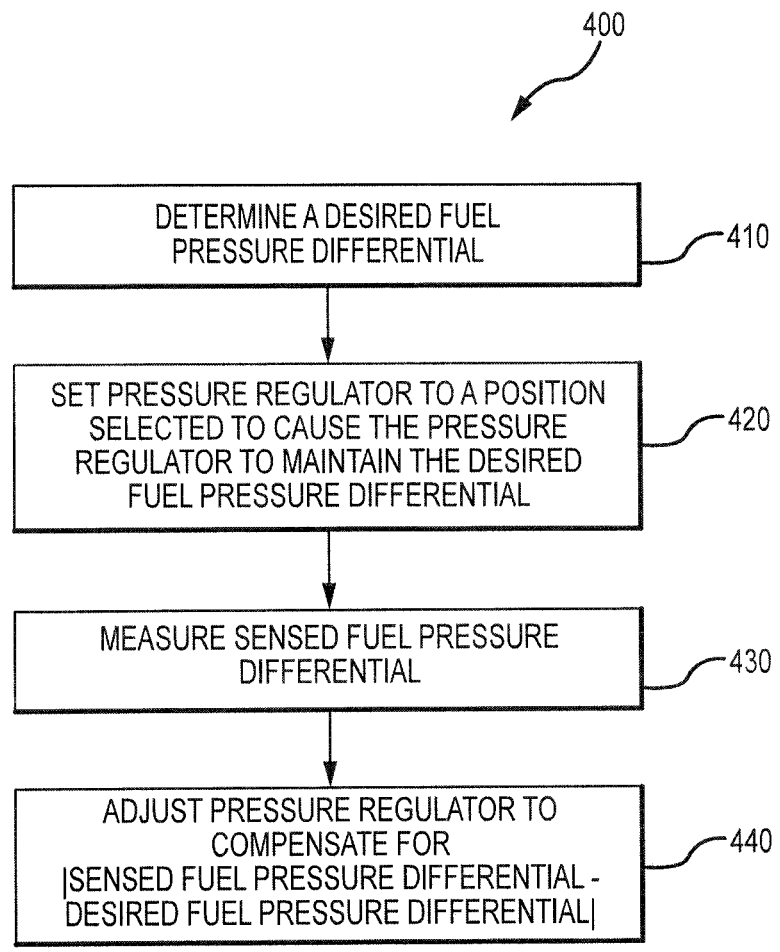
FIGS. 4-7 illustrate various flowcharts of various operations performed by a distributed fuel control system according to various embodiments.

With reference to FIGS. 1, 2, and 4, a distributed fuel control system 2 may operate according to a calibration offsetting method 400. The controller 4 may determine a desired fuel pressure differential (Step 410). Specifically, the controller 4 may ascertain a desired fuel pressure differential in light of aircraft status data 3 (Step 410). The controller 4 may direct the torque motor 15 to set the pressure regulator 14 to a position selected to cause the regulator to maintain the desired fuel pressure differential (Step 420). In various embodiments, the desired fuel pressure differential comprises a desired difference between pressure of fuel 21 in the manifold 22 to the pressure of fuel 21 in the diffuser 26. The controller 4 may direct the torque motor 15 to set the pressure regulator 14 to maintain a desired fuel pressure differential, for example 300 pounds-per-square-inch (about 2068.4 kPa).

The pressure regulator 14 may receive MPSL information 28 via the fluidic interconnection provided by the manifold pressure sense line 46 and may receive the DPSL information 30 via the fluidic interconnection provided by the diffuser pressure sense line 40. The fuel pressure differential is the difference between the pressure of the fuel 21 in the manifold 22 is indicated by the MPSL information 28 and the pressure of the fuel 21 in the diffuser 26 is indicated by the DPSL information 30. The pressure regulator 14 operates to maintain the difference between the pressure indicated by the MPSL information 28 and the DPSL information 30 at the regulator set point. In various embodiments, the direct fluidic communication between the pressure regulator 14 and the manifold 22 provided by the manifold pressure sense line 46, as well as the direct fluidic communication between the pressure regulator 14 and the diffuser 26 provided by the diffuser pressure sense line 40 enable a very fast response by the pressure regulator 14 to changes in the pressure differential between these two lines. In various embodiments, this response is faster than that which would be provided by electronic sensors. Thus, system may enjoy both the quickness of mechanical response as well as the accuracy afforded by the controller's ability to read the pressure sensors and make fine or coarse adjustments.

In various embodiments, such adjustments may include aspects as follows. For example, the actual pressure differential between the manifold 22 and the diffuser 26 may vary from that indicated by the MPSL information 28 and the DPSL information 30. For example, the DPSL information 30 and/or the MPSL information 28 may drop, and/or the pressure regulator 14 may be miscalibrated. Thus, the position to which the pressure regulator 14 is set may not precisely correspond to the actual pressure differential present in the system, for instance, due to wear, or environmental characteristics. In other words, the controller 4 may direct the torque motor 15 to set the pressure regulator 14 to maintain a desired first pressure differential of 300 pounds-per-square-inch (about 2068.4 kPa), but due to errors, the pressure regulator 14 may instead maintain a pressure higher or lower than 300 pounds-per-square-inch.

To compensate for the error, the difference between a sensed pressure differential and the desired fuel pressure differential may be ascertained by the controller 4. For example, the controller 4 may be in electrical communication with the diffuser pressure sense sensor 33. Similarly, the controller 4 may be in electrical communication with the manifold pressure sense sensor 41. The manifold pressure sense sensor 41 provides MPSS data 43 to the controller 4 representative of a sensed manifold pressure, whereas the diffuser pressure sense sensor 33 provides DPSS data 34 representative of a sensed diffuser pressure. The controller 4 may perform calculations comprising subtracting the sensed diffuser pressure from the sensed manifold pressure to determine a sensed pressure differential. Thus the controller 4 may be said to measure a sensed pressure differential (Step 430).

If the measured pressure differential is different from the desired fuel pressure differential, then the controller 4 may send a control signal 5 to the torque motor 15 to change the pressure regulator 14 to a position corresponding to a desired fuel pressure differential plus a calibration offset value. In this manner, the fuel flow rate to the multiplex fuel delivery unit array 24 may be more accurately and precisely determined. Thus the controller 4 may be said to adjust the torque motor 15 in response to a difference between the sensed pressure differential and the desired fuel pressure differential (Step 440). In addition, based on feedback from the multiplex fuel delivery unit flow meters, the set point of the pressure regulator 14 may be further adjusted to achieve a desired flow at each primary nozzle 102, or raise the manifold pressure to the extent needed to allow the electric valves 104 associated with various fuel nozzles to operate within their usable range in order to achieve the desired total flow at pressure regulator 14.

Figure 5:
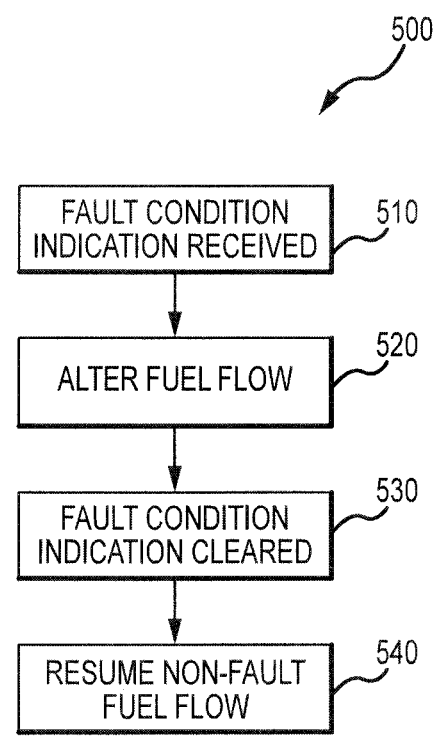

With reference to FIGS. 1, 2, and 5, a distributed fuel control system 2 may operate according to a fault detection method 500. A fault condition indication may be received by the controller 4 (Step 510). For example, the controller 4 may receive an indication that a fuel delivery system sensors 8 (FIG. 1) indicates a low pressure, or a high pressure, or inconsistent and/or unexpected pressures in the fuel delivery system 6. Similarly, the controller 4 may receive an indication that a combustion sensors 10 indicate a high pressure, or a low pressure or unexpected pressures in various components of the fuel delivery system 6 and/or the engine 12. Moreover, the controller 4 may compare data from at least one of the fuel delivery system sensors 8, data from at least one of the combustion sensors 10, and/or aircraft status data 3 to expected values and determine that the data is inconsistent with the expected values. The controller 4 may send a control signal 5 to the torque motor 15 and/or one or more electric valve orifice 105 directing that the fuel flow be altered (Step 520). For example, the fuel flow may be reduced or shutoff in response to some fault conditions, for example, a fire. Moreover, the fuel flow may be adjusted to one or more specific multiplex fuel delivery unit within the multiplex fuel delivery unit array 24 in response to some fault conditions, for example, an indication that a multiplex fuel delivery unit is wearing out, and/or a "hot spot" exists in an engine 12. For example, a fault condition may comprise an indication received at the controller 4 that a portion of the engine 12 is running at too high a temperature (e.g., a "hot spot") or too cold a temperature. The controller 4 may evaluate individual multiplex fuel delivery unit flow data 32-1, 32-2, and/or any individual multiplex fuel delivery unit flow data through 32-n. Thus, the controller 4 may assess the amount of fuel 21 being expelled by each multiplex fuel delivery unit. In response, the fuel flow may be adjusted to one or more specific multiplex fuel delivery unit within the multiplex fuel delivery unit array 24. Subsequently, the controller 4 may receive an indication that the fault condition is cleared (Step 530). In response, the controller 4 may send a control signal 5 directing that the fuel flow be resumed to a non-fault flow rate (Step 540). A non-fault flow rate may be the previous flow rate, or may be the adjusted rate, or may be any desired flow rate. Adjustments may also be made to the degree that one or more valve, such as one or more electric valve 104 is open to adjust the fuel flow value at one or more valves as needed. For example, adjustments may be made in response to multiplex fuel delivery unit wear, such as accumulations of lacquer, coking, and/or plugging from contamination. Moreover, in the event that the valves are directed to be opened more than a set amount, this can be detected by the controller and the condition logged to trigger a maintenance action at a desired time after the detection.

Figure 6:
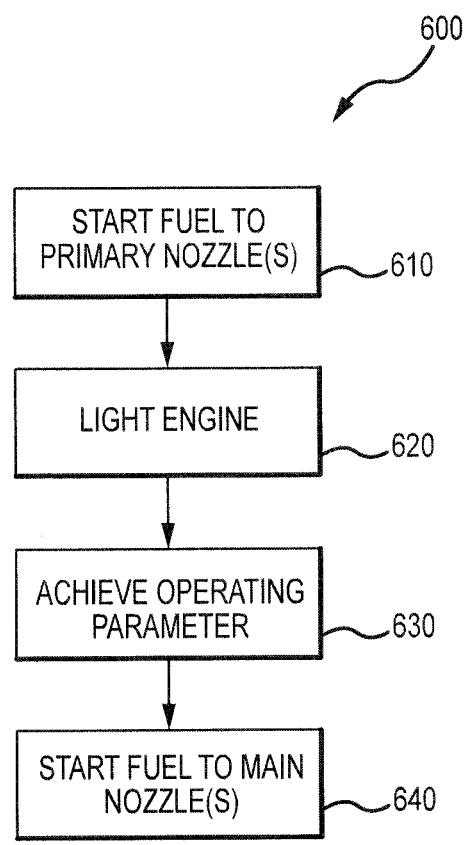

With reference to FIGS. 1, 2, and 6, a distributed fuel control system 2 may operate according to an engine start method 600. For example, during the engine start sequence, it may be desirable to direct fuel flow to different multiplex fuel delivery units within the multiplex fuel delivery unit array 24 at different times. In various example methods, the controller 4 sends a control signal 5 to the torque motor 15 and/or one or more electric valve orifices 105 directing that the fuel flow is started to primary nozzles 102 but directing that the electric valves 104 be closed so that fuel flow to the main nozzles 101 be prevented. Subsequently, the engine 12 may be ignited (Step 620) and may be permitted to run until an operating parameter is achieved (Step 630). For example, an operating parameter may comprise a thrust, a temperature, a revolutions-per-minute ("RPM"), or any other relevant parameter. Subsequently, the controller 4 may send a control signal 5 to the torque motor 15 and/or one or more electric valve orifices 105 directing that the electric valves 104 be at least partially opened so that fuel flow to the primary nozzle 102(*s*) 102 is started (Step 640). Thus as one may appreciate, various control signals may be sent whereby different multiplex fuel delivery units are started at different times during an operating method, such as an engine start method 600. In various scenarios, the fuel flow to the primary nozzles 102 may be set and/or read, and the pressure regulator 14 adjusted (by torque motor 15) to set the desired mass fuel flow. In response to a point in engine operation being reached at which it becomes advantageous to direct fuel to the main nozzles 101, each electric valve 104 may be operated until the desired fuel flow is reached at a corresponding nozzle. If any of the valves is open to the extent that it is near to begin fully open, then the pressure regulator 14 may be adjusted (by torque motor 15) to set the desired mass fuel flow higher, so that the electric valves 104 may be adjusted so that one or more is farther from being fully open. In this manner, the amount of flow to each nozzle may be maintained within desired limits.

The controller may determine that a certain overall fuel flow is desired to be metered out of nozzles that do not have electric valves. For example, the controller may use orifice equations for the manifold, connecting lines, and/or the fuel nozzles to determine a desired delta pressure that will provide a desired flow. A corresponding pressure setpoint may be set using the torque motor. Once the desired pressure setpoint is provided by the torque motor (and subsequently trimmed if desired to an accurate value measured by the multiplex fuel delivery unit flow meter array), the desired flow will flow from the fuel nozzles. The electric valves can then be opened or closed to varying degrees to add, as desired, more fuel flow via the electric valves and the fuel nozzles they are connected to. The multiplexed array of flowmeters can provide data to further adjust the pressure regulator and electric valve settings to refine the amount of flow coming from each multiplexed fuel nozzle. There are multiple settings in the operating envelope of the pressure regulator and the degree of opening of the electric valves that will give the same flow, e.g., a higher delta pressure and more closed valves, or a lower delta pressure and more open valves. At certain engine conditions, a higher pressure and more closed valves is desired, for example to prevent combustor oscillations, and at other conditions a lower pressure and more open valves is desired, for example to make sure the pump pressure is sufficient to deliver the needed flow, or to reduce the horsepower needed to drive the pump at a particular condition.

Figure 7:
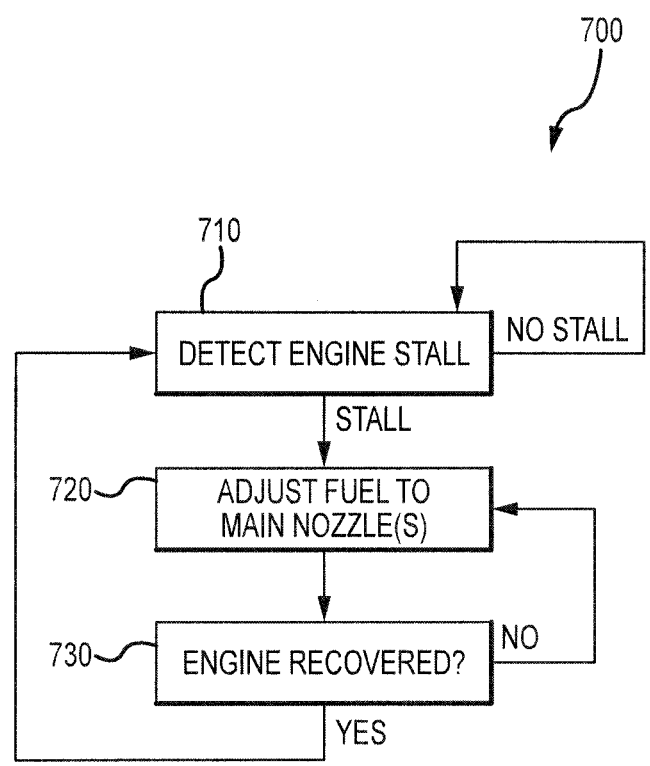

With reference to FIGS. 1, 2, and 7, a distributed fuel control system 2 may operate according to an engine stall detection method 700. For example, a controller 4 may compare data from at least one of the fuel delivery system sensors 8, data from at least one of the combustion sensors 10, and/or aircraft status data 3 to expected values and determine that the data indicates an engine stall (Step 710). In response to an indication of an engine stall, the controller 4 may send a control signal 5 to the torque motor 15 and/or one or more electric valve orifice 105 directing that the fuel flow be adjusted (Step 720). In various embodiments, this adjustment comprises reducing the fuel flow to all multiplex fuel delivery units, although in other embodiments, it may comprise reducing the fuel flow to some multiplex fuel delivery units, or may comprise increasing the fuel flow to some multiplex fuel delivery units and reducing the fuel flow to some multiplex fuel delivery units, or may comprise any adjustment intended to facilitate engine performance. The controller 4 may compare data from at least one of the fuel delivery system sensors 8, data from at least one of the combustion sensors 10, and/or aircraft status data 3 to expected values and determine that the data indicates that the engine 12 has recovered from the stall (Step 730). In response to the engine 12 recovering from the stall, the method returns to Step 710. In response to the engine 12 remaining stalled, the method returns to Step 720 and further adjustment of the fuel flow is directed (Step 720).

Now, having described various components of distributed fuel control systems, various components of distributed fuel control systems may be manufactured from various materials. In various embodiments, various components of distributed fuel control systems may comprise aluminum. However, in further embodiments, various components of distributed fuel control systems may comprise other materials, for example metals, such as titanium, tungsten, aluminum, steel, alloys, or an austenitic nickel-chromium-based alloy such as Inconel® which is available from Special Metals Corporation of New Hartford, N.Y., USA. Various components may comprise ceramics, composites, and plastics. Moreover, they may further comprise any material and numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of distributed fuel control systems as disclosed herein are made of different materials or combinations of materials, and/or may comprise coatings.

In various embodiments, various honeycomb materials may be utilized, for example honeycomb titanium material. Honeycomb material may be made from various processes. For example, it may be manufactured by a process comprising titanium liquid interface diffusion. Moreover, the process comprising titanium liquid interface diffusion may further comprise a Delta-P process or a Delta-Alpha process.

For example, the process comprising titanium liquid interface diffusion may comprise a Delta-P process. Pressure may be applied to a material blank and/or billet and/or panel under a constant temperature. In various embodiments, a Delta-Alpha process may be implemented. For example, the expansion of tooling may create pressure whereby the material blank and/or billet and/or panel may be formed. In various embodiments, various different methods may be used to form various different aspects of various components of distributed fuel control systems.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of distributed fuel control comprising:
    determining, by a controller for distributed fuel control comprising a processor and a tangible, non-transitory memory, a desired fuel pressure differential;
    directing, by the controller, a torque motor in mechanical communication with a pressure regulator to set the pressure regulator to a position corresponding to the desired fuel pressure differential;
    determining, by the controller, a sensed fuel pressure differential between a sensed diffuser pressure from a diffuser pressure sense sensor and a sensed manifold pressure from a manifold pressure sense sensor;
    adjusting, by the controller, the torque motor in response to a difference between the sensed fuel pressure differential and the desired fuel pressure differential;
    terminating, by the pressure regulator and a shutoff valve, a fuel flow in response to a fluidic pressure provided by an over speed sensor deviating from a nominal value.

2. The method according to claim 1, further comprising: receiving, by the controller, an indication of a fault condition; and altering, by the controller, the fuel flow in response to the receiving.

3. The method according to claim 1, further comprising: determining, by the controller, an engine stall;
decreasing, by the controller, a fuel flow to a main nozzle in response to the engine stall;
determining, by the controller, an engine stall recovery; and
increasing, by the controller, the fuel flow to the main nozzle in response to the determining.

4. A distributed fuel control system comprising:
a controller comprising a processor and a tangible, non-transitory memory;
a fuel delivery system disposed in fluidic communication with a fuel supply containing fuel and with an engine;
fuel delivery system sensors;
combustion sensors;
a torque motor in mechanical communication with a pressure regulator;
an over speed sensor in fluidic communication with the pressure regulator and a shut off valve in fluid communication with the fuel supply; and
a diffuser pressure sense line in communication with a diffuser and the pressure regulator, whereby a first diffuser sense pressure is provided to the pressure regulator;
wherein the torque motor is configured to set the pressure regulator to a position corresponding to a desired fuel pressure differential;
wherein the controller is in logical communication with the combustion sensors and the fuel delivery system sensors,
wherein the controller outputs a control signal to the fuel delivery system in response to at least one of the combustion sensors and the fuel delivery system sensors.

5. The distributed fuel control system according to claim 4, wherein the control signal comprises control instructions to the pressure regulator.

6. The distributed fuel control system according to claim 5, wherein the controller is in logical communication with an aircraft data source, and the control instructions are further in response to the aircraft data source.

7. The distributed fuel control system according to claim 6, wherein the aircraft data source provides aircraft status data comprising at least one of an engine status, an engine throttle setting, an engine temperature, or an engine maintenance status.

8. The distributed fuel control system according to claim 7, wherein the aircraft data source comprises a full authority digital engine control.

9. The distributed fuel control system according to claim 4, wherein the pressure regulator comprises a delta-P regulator.

10. The distributed fuel control system according to claim 4 comprising:
a manifold;
a multiplex fuel delivery unit array whereby the fuel is expelled into the engine,
wherein the manifold distributes the fuel from the pressure regulator to the multiplex fuel delivery unit array.

11. The distributed fuel control system according to claim 10, wherein the fuel delivery system sensors comprise:
a mass flow meter whereby mass flow data is provided to the controller;
a manifold pressure sense line whereby a first manifold sense pressure is provided to the pressure regulator; and
a manifold pressure sense sensor whereby manifold pressure sense signal data is provided to the controller.

12. The distributed fuel control system according to claim 10, wherein the combustion sensors comprise:
a multiplex fuel delivery unit array flow meter array disposed between the manifold and the multiplex fuel delivery unit array, whereby individual multiplex fuel delivery unit flow data is provided to the controller; and
a diffuser pressure sense sensor whereby diffuser pressure sense signal data is provided to the controller.

13. The distributed fuel control system according to claim 10,
wherein the multiplex fuel delivery unit array comprises at least one first multiplex fuel delivery unit comprising a fixed orifice whereby the fuel may be expelled into the engine, and
wherein the fixed orifice comprises a primary nozzle and has a fixed flow rate.

14. The distributed fuel control system according to claim 13,
wherein the multiplex fuel delivery unit array comprises at least one second multiplex fuel delivery unit comprising an electric valve orifice whereby the fuel may be expelled into the engine,
wherein the electric valve orifice comprises a main nozzle and has a flow rate variable in response to the control signal.

* * * * *